Dec. 5, 1944.   V. CAPON   2,364,127
MEASURING INSTRUMENT
Filed May 1, 1943
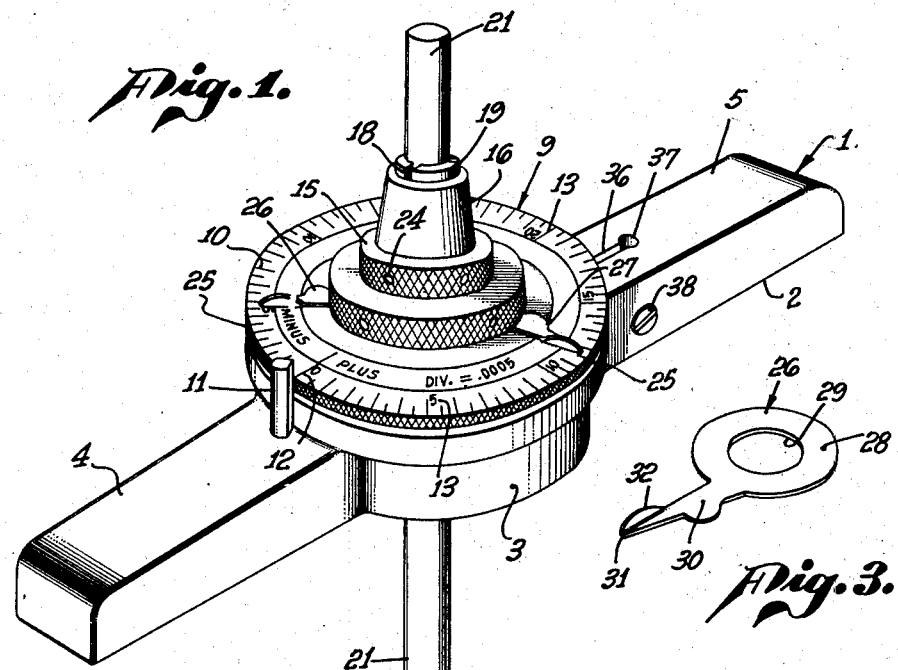
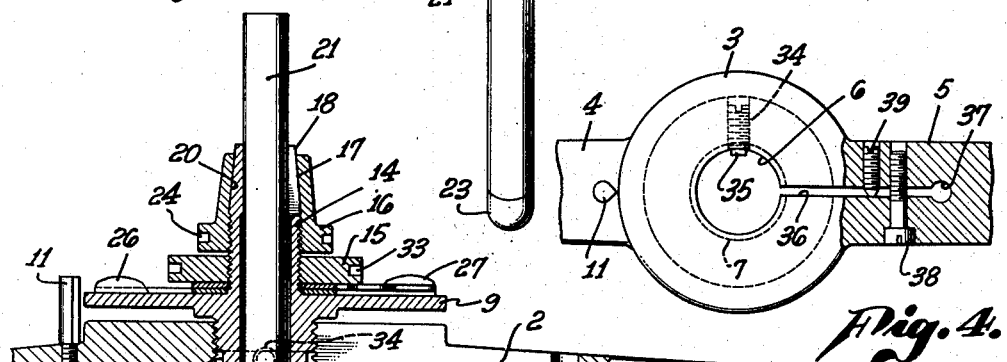
Victor Capon,
INVENTOR.
BY Harold W. Mattingly
ATTORNEY.

Patented Dec. 5, 1944

2,364,127

UNITED STATES PATENT OFFICE 2,364,127

MEASURING INSTRUMENT

Victor Capon, Los Angeles, Calif.

Application May 1, 1943, Serial No. 485,365

2 Claims. (Cl. 33—170)

My invention relates to a measuring instrument, and has particular reference to a micrometer which is particularly adapted for use as a checking or inspection instrument to ascertain whether or not a given dimension of a machine part lies within the specified tolerances.

In the production of machine parts of various types in large quantities, it is essential that each part be checked or inspected to determine whether or not its finished dimensions meet the specifications. It is the conventional practice to specify certain dimensions as, for example, the length of a part or the depth of a hole in terms of the desired dimension with specified tolerances stated. The checking or inspecting operation consists of measuring the given dimension and comparing that with the specified dimension, plus or minus the given tolerances to see whether or not the corresponding dimension of the finished part falls within the specified range of tolerances.

When this operation is performed with conventional micrometers or the like measuring struments, it is necessary to read the micrometer and determine the actual dimension of the part. This must then be compared with the specified dimension for the part to determine whether or not it falls within the tolerances specified. Such an operation is time consuming in that considerable time is required to accurately read within close limits the measurements made with ordinary micrometer measuring devices. Furthermore, frequent errors occur as a result of the requirement for comparing the measured dimension with the specified dimension.

In an attempt to avoid these difficulties manufacturers engaged in quantity production of machine parts have employed "go—no go" gauges. Such gauges suitable for certain types of parts but for intricate shapes for measuring the depths of bores they are entirely inadequate.

It is, therefore, an object of my invention to provide a measuring device which is adapted to measure the length of machine parts or the depth of holes in machine parts and to indicate the relation between the actual dimension measured and the stated dimension to thereby eliminate the necessity for mentally comparing the measured dimension with the specified dimension.

It is additionally an object of my invention to provide a measuring device of the character set forth in the preceding paragraph which includes means for indicating the specified tolerance range and indicating whether or not the measured dimension lies within such range.

It is a still further object of my invention to provide a measuring device of the character set forth in the preceding paragraphs which includes adjustable means for identifying specified tolerances to thereby permit a direct indication of the relation between the measured dimension and the specified dimension with tolerances.

It is also an object of my invention to provide a measuring device of the character set forth in the preceding paragraphs which includes means for adjusting the initial setting of the instrument to provide for the checking of dimensions of differing magnitude.

It is additionally an object of my invention to provide a measuring instrument of the character set forth hereinbefore which includes features of construction permitting the initial adjustments of the instrument to be readily made and which prevent such adjustments from being upset or changed during the normal use of the instrument.

It is also an object of my invention to provide an instrument of the character set forth hereinbefore which is of simple construction and which may be used by a blind person.

Other objects and advantages of my invention will be apparent from a study of the following specifications, read in connection with the accompanying drawing, wherein:

Fig. 1 is a perspective view of the preferred embodiment of my invention;

Fig. 2 is a vertical sectional view through the instrument illustrated in Fig. 1;

Fig. 3 is a perspective view illustrating in detail one of the two indexing means employed on the instrument; and Fig. 4 is a detail plan view of the construction of the base employed on my instrument.

Referring to the drawing, I have illustrated the preferred embodiment of my invention as comprising a base member 1 which defines an under gauging surface 2 which is preferably milled or ground to a predetermined configuration, as for example, a plane surface. The base 1 includes a central boss portion 3 and radially extending arms 4 and 5 adapted to rest upon a workpiece to be checked or upon indexed surfaces of a jig adapted to receive the workpiece to be checked.

The central boss 3 is provided with a vertically extending bore 6 which is internally threaded as indicated at 7 with an accurate micrometer screw thread, preference being expressed for forty threads per inch when the instrument is to be used for the measuring of dimensions in conventional English units.

Within the threaded bore 6 there is received a similarly threaded tubular boss member 8 to which is affixed as by being formed integrally therewith a protractor or indicating dial 9. The dial 9 is provided with graduations 10 which are adapted to be read opposite a witness point or dead-line post 11 secured to and rising from the upper surface of one of the arms 4 or 5.

The graduations 10 preferably include a zero graduation 12 and a series of graduations extending in opposite directions from the zero graduation 12, these latter graduations being identified by suitable indicia 13 and classed by the references "minus" or "plus," respectively.

For use with the English system of measurements the dial 9 is preferably provided with a total of twenty-five or fifty graduations which, with forty threads per inch for the micrometer thread 7, make each graduation correspond, respectively, to 0.001 inch or 0.0005 inch vertical movement of the boss member 8 and dial 9.

From the upper surface of the dial 9 rises a sleeve 14 which is threaded externally to receive a lower knurled clamping ring 15 and an upper outer chuck member 16. The uppermost portion of the sleeve 14 is tapered as indicated at 17 in Fig. 2 and split longitudinally as shown at 18 in Fig. 1 to define a plurality of spring chuck members 19. The tapered surface 17 coacts with a similar tapered surface 20 provided on the interior of the outer chuck member 16. By this means rotation of the outer chuck member 16 may be effective in moving the spring fingers 19 inwardly to clamp and secure a measuring rod 21 which is passed downwardly through an interior bore 22 extended vertically through the boss 8 and the sleeve 14.

The measuring or gauging rod 21 may be of any desired length, but it is preferably provided on its lower end with a removable hardened and polished tip 23 adapted to resist wear and prevent changing of the calibration of the instrument once it is set. If desired, the upper end of the rod 21 may be formed as a male element adapted to connect to the opposite end of a similar rod in place of the tip 23 whereby a number of relatively short length rods 21 may be interconnected to form a long measuring or gauging rod.

By employing the spring chuck 16—19 the position of the rod 21 within the boss 8 may be adjusted to make the distance between the lowermost point of the tip 23 and the gauging surface 2 precisely equal to a specified dimension when the dial 9 is turned to a position placing the zero graduation 12 opposite the witness point 11. For example, suppose it is desired to use the instrument to check the depth of a hole bored in a workpiece and intended to be 2.000 inches deep. To adjust the instrument, the dial 9 is turned to the position illustrated in Fig. 1, placing the zero graduation opposite the dead-line post 11. The chuck 16—19 is loosened and the rod 21 is shifted to a position such that the lowermost point of the tip 23 is precisely 2.000 inches from the under gauging surface 2, this dimension being determined by the use of gauge blocks or standardized micrometers or like measuring instruments. When so adjusted the rod 21 is locked in position by rotating the outer chuck member 16. This may be preliminarily accomplished by grasping the knurled outer periphery of the member 16 with the fingers. For final securing, it is preferred to use a spanner wrench and for this purpose suitable spanner holes 24 are provided in the member 16.

In checking the depth of the hole in the workpiece, the instrument is placed with the rod 21 extending into the hole. The dial 9 is then turned as by grasping the outer periphery thereof with the fingers, the same being knurled as shown at 25 to facilitate this operation. The dial 9 is turned to a position such that the tip 23 is just touching the bottom of the bore to be checked, this condition being readily detected by the "feel" of the dial. If the hole is precisely 2.000 inches deep, the zero graduation 12 will be disposed opposite the dead-line post 11. If, on the other hand, the depth is 2.002 inches, the graduation indicating "plus 0.002 inch" will be opposite the dead-line post 11, clearly indicating that the hole being checked is 0.002 inch deeper than specified.

Because of the impossibility and the lack of necessity of making machine parts precisely to a specified dimension, it is the common practice to specific tolerances as, for example, "2 inches±0.005 inch."

To determine whether or not the indicated difference between the specified dimension and the measured dimension falls within the specified tolerances requires a comparison between the specified tolerance and the deviation indicated by the instrument.

To make it unnecessary for the inspector to know and remember what the specified tolerances are and to make it possible for persons who are blind or have impaired eye sight to act as inspectors, I prefer to use a pair of index members 26 and 27 which may be set with respect to the dial 9 to positions representing the tolerance limits. The members 26 and 27 are identical except that one is made right-handed and the other is made left-handed. The preferred form of construction is shown in Fig. 3. Each of the members 26 and 27 is preferably formed of thin metal and includes a central washer-like portion 28 which is bored as indicated at 29 to receive the sleeeve portion 14. An outwardly projecting arm portion 30 is tapered to define an indicating point 31 and a laterally extending ear or lug is bent up at right angles to the plane of the arm 30 as indicated at 32 to provide a portion which may be readily felt by the fingers, thus permitting the position of the arms 26 or 27 relative to the dead-line post 11 to be detected by feel by a blind person and also to serve as finger-pieces or handles to facilitate the initial setting of the position of the members 26 and 27.

To set the position of these members the knurled clamping ring 15 is loosened and the members 26 and 27 are turned to positions with respect to the dial 9 indicating the specified plus and minus tolerances for the dimension to be checked. The fingers may then be clamped in their adjusted position by properly rotating the clamping nut 15, spanner holes 33 being provided to permit the fingers to be so securely locked as to prevent inadvertent displacement of the members during the use of the instrument.

While I have described the adjustment and operation of the instrument in connection with gauging the depth of a bored hole, it will be obvious to those skilled in the art that the arms 4 and 5 may be given any desired special configuration adapted to suit a particular measuring job or, alternatively, that auxiliary devices such as gauge blocks or jigs may be employed to permit the device to be used for measuring external dimensions such as lengths or breadths of machine parts.

From the foregoing it will be observed that I have provided an instrument for determining the difference between a measured dimension and a specified dimension. By means of the instrument the deviation of the measured dimension from the specified dimension may be easily ascertained and means are provided for indicating whether or not the measured dimension falls within the specified tolerances of the stated dimension. The indexing means employed are so arranged as to permit the device to be readily used by a person who has impaired eye sight or who is blind.

The base member 1 is preferably made of substantial weight and dimensions to lend ample rigidity to the base so that the gauging surface 2 may be machined or ground with high accuracy. Sufficient weight may thus also be incorporated to facilitate determining by feel the setting at which the tip 23 engages the bottom of the hole or the surface of the workpiece.

Preferably the dial 9 is made at least two inches in diameter so that the graduations 10 may be spaced apart an adequate distance to permit direct reading of the instrument while the instrument is in place in checking position and by persons of relatively impaired eye sight without requiring the use of auxiliary magnifying lenses.

When the instrument has been set to measure or check the desired dimension, the dial should not be capable of rotation through more than a single revolution as otherwise the coincidence of the zero graduation with the dead-line post 11 would actually dispose the tip 23 at a position which would be in error by one-fortieth of an inch for each revolution the dial has made. To prevent such inadvertent error, I prevent the rotation of the dial through more than a single revolution by providing an annular groove 40 on the boss 8 into which projects a stop screw 34, the inner end 35 of which has a diameter less than the width of the groove by an amount which will permit a little less than a complete rotation of the dial in either direction.

In order to take up for any looseness which may occur between the base 2 and the threaded boss 8 as may occur by reason of wear between these parts, I prefer to form the base with a longitudinal slot 36 extending from the threaded bore 6 and terminating at its outer end in a circular bore 37. A compression screw 38 extends transversely of the slotted arm 5 of the base and may be tightened to spring the metal of the base inwardly about the threaded boss 8 to take up for any lost motion while the friction of the boss in the base may be accurately adjusted by means of a set screw 39 extending into abutting relation with one of the side walls of the slot as indicated in Fig. 4.

While I have shown and described the preferred embodiment of my invention, I do not desire to be limited to any of the details of construction shown or described herein, except as defined in the appended claims.

I claim:

1. In a measuring instrument, the combination of: a base member defining a reference surface; a measuring member defining a measuring point; means mounting said measuring member on said base member for adjustable movement relative thereto, whereby the distance of said measuring point from said reference surface may be adjusted to a predetermined dimension; micrometer means inter-engaging said base member and said measuring member for moving said measuring member relative to said base member, said micrometer means comprising a boss threadedly engaged with said base member and having an indicating dial secured thereto for indicating the difference between the distance of said measuring point from said reference surface and said predetermined dimension, said boss having formed therein a circumferentially extending groove; and a stop member on said base member received in said groove and having a width less than the width of said groove by an amount sufficient to limit movement of said dial to less than one revolution.

2. In a measuring instrument, the combination of: a base member defining a reference surface and having a threaded bore extended therethrough normal to said surface; a measuring member defining a measuring point; micrometer means inter-engaging said base member and said measuring member for moving said measuring member relative to said base member; means mounting said measuring member on said micrometer for adjustable movement relative thereto, whereby the distance of said measuring point from said reference surface may be adjusted to a predetermined dimension at any selected position of said micrometer, said micrometer means comprising a threaded boss engaged with the threaded bore of said base member and having an indicating dial secured thereto for indicating the difference between the distance of said measuring point from said reference surface and said predetermined dimension, said base member having a slot cut therein parallel to said bore and extending radially outward therefrom to divide said base member into two integrally formed parts; and an adjusting screw extended across said slot and threaded into one of said parts for drawing said parts toward each other to adjust the threaded engagement between said base member and said boss to compensate for wear in said threaded engagement.

VICTOR CAPON.